United States Patent
Sugihara et al.

(10) Patent No.: US 11,891,461 B2
(45) Date of Patent: Feb. 6, 2024

(54) METHOD FOR PRODUCING VINYL ETHER POLYMER CONTAINING HYDROCARBON GROUP BY RADICAL POLYMERIZATION

(71) Applicant: MARUZEN PETROCHEMICAL CO., LTD., Tokyo (JP)

(72) Inventors: Shinji Sugihara, Fukui (JP); Masahiro Endo, Ichihara (JP)

(73) Assignee: Maruzen Petrochemical Co., Ltd., Tokyo (JP)

( * ) Notice: Subject to any disclaimer, the term of this patent is extended or adjusted under 35 U.S.C. 154(b) by 596 days.

(21) Appl. No.: 17/257,664

(22) PCT Filed: Jun. 14, 2019

(86) PCT No.: PCT/JP2019/023602
§ 371 (c)(1),
(2) Date: Jan. 4, 2021

(87) PCT Pub. No.: WO2020/021902
PCT Pub. Date: Jan. 30, 2020

(65) Prior Publication Data
US 2021/0122847 A1    Apr. 29, 2021

(30) Foreign Application Priority Data
Jul. 23, 2018    (JP) .................................. 2018-137969

(51) Int. Cl.
*C08F 16/18*    (2006.01)
*C08F 16/22*    (2006.01)
(Continued)

(52) U.S. Cl.
CPC .............. *C08F 16/18* (2013.01); *C08F 2/10* (2013.01); *C08F 4/04* (2013.01); *C08F 16/22* (2013.01);
(Continued)

(58) Field of Classification Search
CPC ............. C08F 2/10; C08F 16/18; C08F 16/22
See application file for complete search history.

(56) References Cited

U.S. PATENT DOCUMENTS

| | | |
|---|---|---|
| 2015/0005467 A1 | 1/2015 | Sugihara et al. |
| 2018/0179305 A1 | 6/2018 | Sugihara et al. |

(Continued)

FOREIGN PATENT DOCUMENTS

| | | |
|---|---|---|
| EP | 2 816 065 A1 | 12/2014 |
| JP | 5936184 B2 | 6/2016 |

(Continued)

OTHER PUBLICATIONS

Miyamoto et al., Macromol. Chem. Phys. 199, 119-125 (1998).*
(Continued)

*Primary Examiner* — Vu A Nguyen
(74) *Attorney, Agent, or Firm* — BURR PATENT LAW, PLLC (57) ABSTRACT

[Object] To provide a method for producing a vinyl ether polymer containing a hydrocarbon group in a stable and efficient manner, wherein decomposition of the monomer and generation of polyacetal are suppressed.

[Means for solving problem] The method for producing a vinyl ether polymer containing a hydrocarbon group according to the present invention comprises the step of polymerizing vinyl ether represented by the following formula (1):

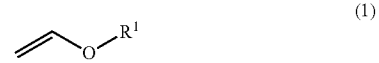

(1)

wherein $R^1$ represents an aliphatic hydrocarbon group having 1 to 10 carbons or an alicyclic hydrocarbon group having 3 to 10 carbons, (Continued)

in the presence of water as a polymerization solvent and an organic azo-based compound as a radical polymerization initiator, under pH of 6 or more.

5 Claims, 1 Drawing Sheet

(51) Int. Cl.
  *C08F 2/10* (2006.01)
  *C08F 4/04* (2006.01)
  *C08K 3/22* (2006.01)
  *C08K 5/17* (2006.01)
  *C08K 5/23* (2006.01)

(52) U.S. Cl.
  CPC .............. *C08K 3/22* (2013.01); *C08K 5/17* (2013.01); *C08K 5/23* (2013.01); *C08K 2003/2203* (2013.01)

(56) References Cited

U.S. PATENT DOCUMENTS

| 2018/0371127 A1 | 12/2018 | Yoshida et al. |
| 2020/0190234 A1 | 6/2020 | Sugihara et al. |

FOREIGN PATENT DOCUMENTS

| JP | 2017-014438 A1 | 1/2017 |
| TW | 201402616 A | 1/2014 |
| WO | 2013/121910 A1 | 8/2013 |
| WO | 2014/136948 A1 | 9/2014 |
| WO | 2017/006817 A1 | 1/2017 |
| WO | 2017/110634 A1 | 6/2017 |
| WO | 2019/044221 A1 | 3/2019 |

OTHER PUBLICATIONS

Sugihara et al., Macromolecules, 2017, 50(21), 8346-8356.*

International Search Report and Written Opinion (Application No. PCT/JP2019/023 602) dated Sep. 10, 2019.

English translation of the International Preliminary Report on Patentability (Chapter 1) (Application No. PCT/JP2019/023602) dated Feb. 4, 2021.

European Office Action (Application No. 19 840 069.9) dated Mar. 31, 2023 (4 pages).

Taiwanese Office Action (Application No. 108123541) dated Oct. 6, 2022 (with English translation).

Extended European Search Report dated Mar. 31, 2022 (Application No. 19840069.9).

Sugihara et al., "*Design of Hydroxy-Functionalized Thermoresponsive Copolymers: Improved Direct Radical Polymerization of Hydroy-Functional Vinyl Ethers*," Macromolecules, vol. 50, No. 21, Nov. 14, 2017 (Nov. 14, 2017), pp. 8346-8356.

Miyamoto et al., "*Radical Polymerization of Oligoethylene Glycol Methyl Vinyl Ethers in Protic Polar Solvents*," Macromolecular Chemistry and Physics, Wiley-VCH Verlag, Weinheim, Germany, vol. 119, Jan. 1, 1998 (Jan. 1, 1998), pp. 119-125.

Sugihara et al., "*Design of Hydroxy-Functionalized Thermoresponsive Copolymers: Improved Direct Radical Polymerization of Hydroxy-Functional Vinyl Ethers*," Macromolecules, vol. 50, No. 21, Oct. 23, 2017 (Oct. 23, 2017), pp. 8346-8356 (Citation Amended).

Miyamoto et al., "*Radical Polymerization of Oligoethylene Glycol Methyl Vinyl Ethers in Protic Polar Solvents*," Macromolecular Chemistry and Physics, Wiley-VCH Verlag, Weinheim, Germany, vol. 199, Dec. 16, 1998 (Dec. 16, 1998), pp. 119-125 (Citation Amended).

Korean Office Action (Application No. 10-2020-7034395) dated Jun. 27, 2023 (With English translation) (14 pages).

* cited by examiner

METHOD FOR PRODUCING VINYL ETHER POLYMER CONTAINING HYDROCARBON GROUP BY RADICAL POLYMERIZATION

TECHNICAL FIELD

The present invention relates to a method for producing a vinyl ether polymer containing a hydrocarbon group by radical polymerization.

BACKGROUND ART

A vinyl ether polymer containing a hydrocarbon group is used as a blend component of adhesives, paints and lubricant oils. It has the characteristics of heat stimulation response and biocompatibility, and by using its characteristics, is applicable to medical materials, cosmetics, and the like.

Since generally vinyl ether has an electron-releasing substituent, a vinyl ether polymer is known to be obtained by cation polymerization. However, since reaction in cation polymerization is normally conducted under a low temperature condition of 0° C. or less, a cooling device is necessary, requiring a great amount of cost for installing and using. In addition, since generally the initiator used in cation polymerization is a Lewis acid that becomes deactivated by water, the reaction needs to be conducted in an anhydrous state and in inert gas. Therefore, it is difficult to produce the vinyl ether polymer by cation polymerization industrially low in cost and in an efficient manner.

A representative polymerization method that is industrially advantageous is radical polymerization; however vinyl ether monomers are low in radical polymerization properties, and conventionally, it had been difficult to obtain a vinyl ether polymer by radical polymerization with a high yield. However, according to recent studies, it is known that by establishing suitable reaction conditions and using a specific vinyl ether monomer will promote the radical polymerization to give a vinyl ether polymer (see Patent Documents 1 and 2).

For example, Patent Document 1 discloses a method for obtaining a vinyl ether polymer containing a hydroxyl group such as 2-hydroxyethyl vinyl ether and 4-hydroxybutyl vinyl ether, using 2,2'-azobisisobutyronitrile (AIBN) as an initiator in bulk polymerization or in a water solvent. However, polymerization using AIBN resulted in low monomer conversion rate, and polymerization was not efficiently conducted.

Patent Document 1 also discloses an example in which the monomer conversion rate of the vinyl ether polymer containing a hydroxyl group was improved by conducting polymerization in conditions in which a non-nitrile azo-based initiator such as 2,2'-azobis isomethyl butyrate (MAIB) was used as an initiator in an alcoholic solvent. However, in this condition, polyacetal was generated depending on the kind of alcohols used as the solvent, and the yield of the target vinyl ether polymer containing a hydroxyl group was confirmed to be significantly reduced, despite of the case in which an alcoholic-based solvent and a non-nitrile azo-based initiator were used.

Patent Document 2 discloses a polymerization example in which improvement was made to the conditions as disclosed in Patent Document 1, and with respect to the vinyl ether containing a hydroxyl group, there was disclosed a polymerization case in which a homopolymer of the vinyl ether was obtained in a high conversion rate by using MAIB as the initiator.

On the other hand, in relation to the vinyl ether containing a hydrocarbon group, there has not been an established condition for obtaining a polymer by radical polymerization.

PRIOR ART REFERENCES

Patent Documents

[Patent Document 1] Japanese Patent Laid-Open Publication No. 5936184
[Patent Document 2] Japanese Patent Application Laid-Open Publication No. 2017-014438

SUMMARY OF THE INVENTION

Problems to be Solved by the Invention

When homopolymerization of the vinyl ether containing a hydrocarbon group was conducted under a general radical polymerization condition in an organic solvent or the conditions as disclosed in Patent Document 2, it was confirmed that progress of polymerization of the vinyl ether was small and the majority of the monomers was unreacted, or else decomposition reaction progressed, resulting in a failure to obtain the polymers in a stable and efficient manner.

The present invention has been made in consideration of the above-described current status and the object of the present invention is to provide a method for producing a vinyl ether polymer containing a hydrocarbon group, wherein decomposition of the monomer and generation of polyacetal are suppressed, in a stable and efficient manner.

Means for Solving the Problems

In order to solve the above-described problems, the present inventors intensively studied to find that radical polymerization of vinyl ether containing a hydrocarbon group under specific polymerization conditions can suppress decomposition of the monomer and generation of polyacetal, and as a result, a vinyl ether polymer containing a hydrocarbon group is obtained in a more higher polymer selectivity, thereby completing the present invention.

That is, the present invention provides <1> to <7> as follows.

<1> A method for producing a vinyl ether polymer containing a hydrocarbon group, comprising the step of polymerizing vinyl ether represented by the following formula (1):

(1)

wherein $R^1$ represents an aliphatic hydrocarbon group having 1 to 10 carbons or an alicyclic hydrocarbon group having 3 to 10 carbons,
in the presence of water as a polymerization solvent and an organic azo-based compound as a radical polymerization initiator, under pH of 6 or more.

<2> The production method according to <1>, wherein the basic compound as a pH adjuster is added in the amount of 0.001 to 1 mol % based on the total amount of the vinyl ether.

<3> The production method according to <2>, wherein the basic compound is an alkali metal hydroxide or an amine compound.

<4> The production method according to any one of <1> to <3>, wherein the organic azo-based compound is a compound represented by the following formula (2):

wherein $R^2$ to $R^5$ each independently represent a hydrogen atom or an alkyl group; and $R^6$ and $R^7$ each independently represent a nitrile group, an ester group having an alkoxy moiety optionally having a substituent, or an amide group having an alkylamino moiety optionally having a substituent.

<5> The production method according to any one of <1> to <4>, wherein the organic azo-based compound is an azo ester compound.
<6> The production method according to any one of <1> to <5>, wherein the weight average molecular weight of the vinyl ether polymer is 1000 to 50000.
<7> The production method according to any one of <1> to <6>, wherein the polymer selectivity is 80% or more.

Effect of the Invention

According to the method for producing a vinyl ether polymer containing a hydrocarbon group of the present invention, decomposition of the monomer and generation of polyacetal can be suppressed by radical polymerization of vinyl ether containing a hydrocarbon group under a specific polymerization condition, and as a result, such polymer is obtained in a higher polymer selectivity.

MODE FOR CARRYING OUT THE INVENTION

<Method for Producing Vinyl Ether Polymer Containing Hydrocarbon Group>

The method for producing a vinyl ether polymer containing a hydrocarbon group of the present invention is characterized in comprising the step of conducting radical polymerization of the vinyl ether containing a hydrocarbon group under specific conditions. Detailed description of such radical polymerization step is described below.

<Monomer Component>

The vinyl ether containing a hydrocarbon group used in the present invention is represented by the following formula (1):

wherein $R^1$ represents an aliphatic hydrocarbon group having 1 to 10 carbons or an alicyclic hydrocarbon group having 3 to 10 carbons.

The number of carbons of the aliphatic hydrocarbon group represented by $R^1$ in formula (1) is 1 to 10 and preferably 1 to 8. Examples of the aliphatic hydrocarbon group include, in particular, linear or branched alkyl groups such as methyl groups, ethyl groups, n-propyl groups, isopropyl groups, n-butyl groups, sec-butyl groups, isobutyl groups, tert-butyl groups, n-pentyl groups, isopentyl groups, neopentyl groups, n-hexyl groups, n-heptyl groups, n-octyl groups, 2-ethyl hexyl groups; alkyl groups having cycloalkyl groups as substituents such as cyclohexyl methyl groups and 1-adamantyl methyl groups; linear or branched alkenyl groups such as allyl groups, isopropenyl groups, butenyl groups, pentenyl groups, hexenyl groups, heptenyl groups, and octenyl groups. Amongst these, preferred are linear or branched alkyl groups such as ethyl groups, n-propyl groups, n-butyl groups, isobutyl groups, and 2-ethyl hexyl groups as the aliphatic hydrocarbon groups.

The number of carbons of the alicyclic hydrocarbon group represented by $R^1$. in Formula (1) is 3 to 10 and preferably 5 to 10. Examples of the alicyclic hydrocarbon group include, in particular, monocyclic cycloalkyl groups such as cyclopropyl groups, cyclobutyl groups, cyclopentyl groups, cyclohexyl groups, cyclooctyl groups; monocyclic cycloalkenyl groups such as cyclopentenyl groups and cyclohexenyl groups; polycyclic hydrocarbon groups such as perhydro naphtyl groups, adamantyl groups, tricyclo decanyl groups, and norbonyl groups. Amongst these, preferred are monocyclic cycloalkyl groups such as cyclopentyl groups and cyclohexyl groups.

Examples of the vinyl ether monomers represented by Formula (1) include methyl vinyl ether, ethyl vinyl ether, n-propyl vinyl ether, isopropyl vinyl ether, n-butyl vinyl ether, sec-butyl vinyl ether, isobutyl vinyl ether, tert-butyl vinyl ether, n-pentyl vinyl ether, isopentyl vinyl ether, neopentyl vinyl ether, n-hexyl vinyl ether, n-heptyl vinyl ether, n-octyl vinyl ether, 2-ethyl hexyl vinyl ether, cyclopentyl vinyl ether, cyclohexyl vinyl ether, and 2-adamantyl vinyl ether.

<Polymerization Solvent>

In the present invention, water is used essentially as a polymerization solvent. A water-soluble organic solvent may be used in combination as the polymerization solvent, as long as the effect of the present invention is not impaired. "Water-soluble", as used herein, means that solubility to water at 25° C. (amount of solute against 100 g of water) is 1 g or more. Owing to the use of water as the solvent, Oft in water and the ether oxygen in the vinyl ether forms a hydrogen bond, whereby the electron-releasing properties of the vinyl ether is reduced and the β cleavage at the time of occurrence of radicals is prevented, and as a result, the radical polymerization property of the vinyl ether is enhanced. Although most of the vinyl ether containing a hydrocarbon group are not dissolved in water, the vinyl ether may or may not be dissolved in water during polymerization. If the vinyl ether monomer is not dissolved in water, it is preferable to agitate it with sufficient power during polymerization to increase the contact between the water and the vinyl ether.

The amount of water used is, without particular limitation, 5 to 2000 parts by mass and preferably 10 to 1000 parts by mass, based on 100 parts by mass of the vinyl ether containing a hydrocarbon group. The amount of water based on the total amount of the polymerization solvent is 10% by mass to 100% by mass, preferably 20% by mass or more, and more preferably 50% by mass or more.

Examples of the above-described water-soluble organic solvent include: monovalent alcoholic solvents such as methanol, ethanol, and isopropanol; polyvalent alcoholic solvents such as ethylene glycol, glycerine, and diethylene glycol; ether alcohols such as cellosolve, methyl cellosolve, ethylene glycol monomethyl ether, and ethylene glycol monoethyl ether; amides such as N,N-dimethyl formamide and N-methyl pyrrolidone; sulfoxides such as dimethyl sulfoxide; ketones such as acetone and methyl ethyl ketone; and cyclic ethers such as tetrahydrofurane and dioxane; and one of these may be used alone or two or more in a combination.

<Radical Polymerization Initiator>

In the present invention, a conventionally known radical polymerization initiator can be used, as long as it is an organic azo-based compound.

The amount of the radical polymerization initiator used is preferably 0.1 to 50 mol %, more preferably 0.2 to 20 mol %, further preferably 0.5 to 10 mol %, further more preferably 1 to 5 mol %, based on 1 mol % of the vinyl ether containing hydrocarbon group.

In the present invention, the organic azo-based compound used may be one represented by the following formula (2):

(2)

wherein $R^2$ to $R^5$ each independently represent a hydrogen atom or an alkyl group; and $R^6$ and $R^7$ each independently represent a nitrile group, an ester group having an alkoxy moiety optionally having a substituent, or an amide group having an alkylamino moiety optionally having a substituent.

Examples of the above-described organic azo-based compound include: azonitrile compounds such as 2,2'-azobi-sisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), and 1,1'-azobis(cyclohexane-1-carbonitrile); azo ester compounds such as 2,2'-azobis methylisobutyrate; azoamide compounds such as 2,2'-azobis[2-(3,4,5,6-tetrahydropyrimidine-2-yl)propane]dihydrochloride, 2,2'-azobis{2-methyl-N-[1,1-bis(hydroxymethyl)-2-hydroxylethyl]-propionamide, 2,2'-azobis[2-methyl-N-(2-hydroxylethyl)-propionamide], and 2,2'-azobis[N-(2-propenyl)-2-methyl propionamide]; and 2,2'-azobis(2,4,4-trimethyl pentane). Preferably used amongst these are the azo ester compounds, in view of suppressing polyacetalization.

<pH Adjusting Agent>

In the present invention, it is preferable to add a basic compound as a pH adjusting agent (additive) in order to set the pH at the time of polymerization to 6 or more. The pH at the time of polymerization is 6 or more, preferably 8 to 14, more preferably 10 to 13. When the pH at the time of polymerization is less than 6 (acidic to about weakly acidic), the vinyl ether containing a hydrocarbon group induces hydrolysis by the hydrogen ions in the reaction system to decompose into alcohol and aldehyde, resulting in significant decrease in the polymer yield and selectivity. Although the addition of the basic compound is not essential depending on the reaction system, since there can be conceived of the possibility that the pH becomes less than 6 during polymerization due to the effect of the carbon dioxide and material impurities that are dissolved in the aqueous solution, the decomposition residues of the radical polymerization initiator, etc. the pH is preferably maintained high by adding a basic compound for progressing polymerization with stability and high selectivity.

Due to the presence of the cationic species that are capable of interacting with the vinyl ether as the cationic species of the basic compound, the cationic species attract the electrons from the oxygen atoms of the vinyl ether monomer, thereby improving the radical polymerization property of the vinyl group. It is considered that by the effect of the cationic species and the effect of the hydrogen bond in the aqueous solvent as above, radical polymerization is progressed under the polymerization condition of the present invention, even with the hydrocarbon group containing vinyl ether that has low polymerization property.

The amount of the basic compound used is preferably, without particular limitation, from 0.001 to 1 mol %, more preferably from 0.01 to 0.5 mol %, further preferably from 0.05 to 0.3 mol %, based on 1 mol of the hydrocarbon containing vinyl ether.

Examples of the basic compound having both the effect of suppressing hydrolysis of the vinyl ether and improving the radical polymerization include alkali metal hydroxides such as lithium hydroxide and sodium hydroxide; and amine compounds such as ammonium and triethyl amine. In the present invention, one of these may be used alone, or two or more of these in combination.

<Vinyl Ether Polymer Containing Hydrocarbon Group>

In the present invention, the weight average molecular weight (Mw) and the molecular weight distribution (Mw/Mn) of the vinyl ether polymer containing a hydrocarbon group are not particularly limited and may be appropriately selected depending on the application. For example, the weight average molecular weight (Mw) is preferably within the range from 1000 to 50000, more preferably within the range from 2000 to 30000, further preferably 3000 to 15000, further more preferably 4000 to 10000, in view of exhibiting macromolecular properties. The molecular weight distribution (Mw/Mn) is preferably from 1.1 to 2.0, more preferably from 1.15 to 1.80, further preferably from 1.2 to 1.7, in view of homogenizing the polymer properties. In the present specification, the weight average molecular weight (Mw) and the molecular weight distribution (Mw/Mn) are measured values by GPC (gel permeation chromatography), and can be measured with the measuring conditions as mentioned below.

In the present invention, the monomer conversion rate is, without particular limitation, preferably 40% or more, more preferably 50% or more.

In the present invention, the polymer selectivity is without particular limitation, preferably 70% or more, more preferably 80% or more, further preferably 90% or more.

The "monomer conversion rate" as used herein, is obtained by calculating the rate of the monomers consumed during polymerization (or after polymerization) based on the total amount of the monomers before polymerization, from the peak area of the monomers measured by gas chromatography (GC) in measuring conditions to be explained below (therefore, with respect to the conversion rate, there is no distinction between the polymerization of the monomers and the monomer decomposition).

The "polymer selectivity" represents the rate of polymer generated based on the consumed monomers, and upon calculating the monomer decomposition rate from the peak area of alcohol (monomer decompositions) in GC, is obtained as follows: [Polymer selectivity (%)]=[100 (%)]−[monomer decomposition rate (%)].

<Polymerization Step>

In the production method according to the present invention, the reaction temperature of the polymerization step (polymerization temperature) may be appropriately selected depending on the kind of polymerization initiator, and reaction (polymerization) may be performed by changing the temperature gradually. Generally, the temperature is preferably within the range from 50 to 100° C. and especially preferably from 60 to 90° C.

The reaction time of the polymerization step varies depending on the type of reagent, amount, and the reaction temperature, and preferably is from 2 to 100 hours, more preferably from 3 to 75 hours, further preferably from 5 to 50 hours.

The polymerization process is not particularly limited, for example, a monomer, a polymerization solvent, an additive, and a polymerization initiator may be fed into a reactor beforehand, and the polymerization can be initiated by elevating the temperature. The polymerization may also start by adding a polymerization initiator to a heated monomer or a monomer solution. The addition of the polymerization initiator may be done sequentially or in one time. These may also be combined and a portion of the polymerization initiator may be fed into the reactor and thereafter, the rest of the portion may be added sequentially to the reaction system. In the case of sequential addition, the operation becomes complex; however the polymerization reaction is easily controlled. When the additive is mixed with the solvent before it is added to the monomer, the additive is preferably mixed with the monomer beforehand since hydrolysis of the monomers proceeds.

After the reaction completed, the obtained vinyl ether polymer containing a hydrocarbon group can be isolated by treating with known operation and treatment process.

EXAMPLES

The present invention will be elaborated below with the aid of Examples; however, the present invention shall not be limited by the disclosure of the following Examples. Measurement in the following Examples was in accordance with the following measurement method.

pH was measured using Seven 2 Go manufactured by Mettler-Toledo K.K., by impregnating the electrode into an aqueous phase as of before polymerization.

The calculation of the monomer conversion rate and polymer selectivity in the polymerization reaction was conducted using gas chromatography (GC).
<Conditions>
Column: DB-1 (manufactured by Agilent Technologies K.K.)
Temperature elevation program: retained for 5 minutes at 50° C.→temperature elevation at 10° C./min→retained for 5 minutes at 250° C.
Carrier gas: nitrogen
Column flow rate: 0.95 ml/min The weight average molecular weight (Mw) and the molecular weight distribution (Mw/Mn) of the homopolymer and the copolymer were analyzed by means of gel permeation chromatography (GPC).
<Conditions>
Column: Shodex GPC LF804×3 (manufactured by Showa Denko K.K.)
Solvent: tetrahydrofuran
Measurement Temperature: 40° C.
Flow Rate: 1.0 ml/min
Standard Curve: polystyrene standard All the vinyl ethers used in the following Examples were subjected to distillation and were used after removing potassium hydroxide that was contained as a stabilizer.

Example 1

Production of Polybutyl Vinyl Ether (Addition of 0.20 mol % of Sodium Hydroxide)

Into a flask, there were added a stirrer, 45 g (449 mmol) of n-butyl vinyl ether (herein under referred to as "nBVE"), 3.1 g (13.5 mmol, 3 mol % based on the monomer) of 2,2'-azobis methylisobutyrate ("V-601" manufactured by Wako Pure Chemicals K.K., herein under referred to as "MAIB"), 38.3 g of ion exchange water, and 3.59 g of 1 wt % aqueous sodium hydroxide solution as an additive (corresponds to 0.90 mmol of sodium hydroxide, 0.20 mol % based on the monomer), and the flask was plugged. The pH of the aqueous phase was 12.5. Stirring was continued until MAIB was dissolved, then the flask was placed in a water bath which was preheated to 70° C., and heated with stirring for 7 hours to polymerize. After completion of polymerization, polymerization was stopped by cooling the flask in an ice bath to give polybutyl vinyl ether (herein under referred to as "PnBVE"). The conversion rate of nBVE was 53%, in which the proportion the monomer converted to the polymer (herein under referred to as the "polymer selectivity") was 100%, Mw of PnBVE was 4920, and Mw/Mn was 1.46.

Example 2

Production of Polybutyl Vinyl Ether (Addition of 0.01 mol of Sodium Hydroxide)

PnBVE was synthesized in a similar manner as Example 1, except that the amount of 1 wt % aqueous sodium hydroxide solution added was changed to 0.18 g (corresponds to 0.045 mmol of sodium hydroxide, 0.01 mol % based on the monomer). The pH of the aqueous phase was 10.5. The conversion rate of nBVE was 46%, the polymer selectivity was 100%, Mw of PnBVE was 4900, and Mw/Mn was 1.45.

Example 3

Production of Polybutyl Vinyl Ether (No Addition of Additive)

PnBVE was synthesized in a similar manner as Example 1, except that the additive sodium hydroxide was not added. The pH of the aqueous phase was 6.0. The conversion rate of nBVE was 56%, the polymer selectivity was 84%, Mw of PnBVE was 3430, and Mw/Mn was 1.29.

Comparative Example 1

Production of Polybutyl Vinyl Ether (Addition of 0.0001mol % of Hydrogen Chloride)

PnBVE was synthesized in a similar manner as Example 1, except that the additive was changed to 0.17g of 0.01wt % hydrochloric acid (corresponds to 0.00045mmol of hydrogen chloride; 0.0001 mol % based on the monomer). The pH of the aqueous phase was 5.1. The conversion rate of nBVE was 89%, the polymer selectivity was 23%, Mw of PnBVE was 2820, and Mw/Mn was 1.40.

Comparative Example 2

Production of Polybutyl Vinyl Ether (Addition of 0.01 mol % of Hydrogen Chloride)

PnBVE was synthesized in a similar manner as Example 1, except that the additive was changed to 0.17g of 1 wt % hydrochloric acid (corresponds to 0.045 mmol of hydrogen chloride, 0.01 mol % based on the monomer). The pH of the aqueous phase was 3.2. The conversion rate of nBVE was 98%, the polymer selectivity was 26%, Mw of PnBVE was 1840, and Mw/Mn was 1.26.

Comparative Example 3

Production of Polybutyl Vinyl Ether (Addition of 1 mol % of Hydrogen Chloride)

PnBVE was synthesized in a similar manner as Example 1, except that the additive was changed to 1.64 g of 1 wt % hydrochloric acid (corresponds to 4.5 mmol of hydrogen chloride, 1 mol % based on the monomer). The pH of the aqueous phase was 2.0. The conversion rate of nBVE was 100%, the polymer selectivity was 17%, Mw of PnBVE was 1440, and Mw/Mn was 1.09.

Figure 1:
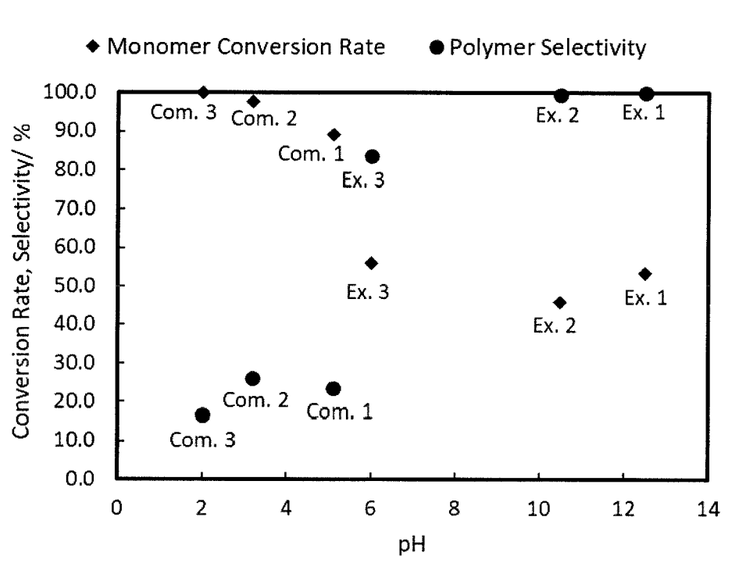
FIG. 1 shows the monomer conversion rate (nBVE) and the polymer selectivity (PnBVE) in Examples 1 to 3 and Comparative Examples 1 to 3.

The monomer conversion rate and the polymer selectivity in Examples 1 to 3 and Comparative Examples 1 to 3 are shown in FIG. 1.

From the results of Examples 1 to 3 and Comparative Examples 1 to 3, it is confirmed that the monomer decomposition is suppressed and the polymer selectivity is greatly improved in the polymerization of vinyl ether polymer containing a hydrocarbon group when the pH of the feed solution before polymerization was set to 6 or more.

Example 4

Production of Polybutyl Vinyl Ether (Addition of 0.20 mol % of Lithium Hydroxide)

PnBVE was synthesized in a similar manner as Example 1, except that the additive was changed to 2.16 g of 1 wt % lithium hydroxide (corresponds to 0.90 mmol of lithium hydroxide, 0.20 mol % based on the monomer). The pH of the aqueous phase was 12.5. The conversion rate of nBVE was 53%, the polymer selectivity was 100%, Mw of PnBVE was 4800, and Mw/Mn was 1.44.

Example 5

Production of Polybutyl Vinyl Ether (Addition of 0.20 mol % of Triethyl Amine)

PnBVE was synthesized in a similar manner as Example 1, except that the additive was changed to 9.09 g of 1 wt % aqueous triethyl amine solution (corresponds to 0.90 mmol of triethyl amine, 0.20 mol % based on the monomer). The pH of the aqueous phase was 10.8. The conversion rate of nBVE was 55%, the polymer selectivity was 100%, Mw of PnBVE was 4850, and Mw/Mn was 1.43.

Example 6

Production of Polybutyl Vinyl Ether (Addition of 0.20 mol of Ammonia)

PnBVE was synthesized in a similar manner as Example 1, except that the additive was changed to 1.53 g of 1 wt % aqueous ammonia solution (corresponds to 0.90 mmol of ammonia, 0.20 mol % based on the monomer). The pH of the aqueous phase was 10.7. The conversion rate of nBVE was 52%, the polymer selectivity was 100%, Mw of PnBVE was 4870, and Mw/Mn was 1.44.

It is confirmed from the results of Examples 4 to 6 that the use of the basic compound as the additive suppresses the monomer decomposition and largely improves the polymer selectivity.

Example 7

Production of Polybutyl Vinyl Ether (1.0 mol % of MAIB)

PnBVE was synthesized in a similar manner as Example 4, except that 1.03 g of MAIB was added (4.47 mmol, 1.0 mol % based on the monomer). The pH of the aqueous phase was 12.2. The conversion rate of nBVE was 41%, the polymer selectivity was 100%, and Mw of PnBVE was 7090 and Mw/Mn was 1.33.

Example 8

Production of Polybutyl Vinyl Ether (5.0 mol % of MAIB)

PnBVE was synthesized in a similar manner as Example 4, except that 5.17 g of MAIB was added (22.5 mmol, 5.0 mol % based on the monomer). The pH of the aqueous phase was 12.1. The conversion rate of nBVE was 59%, the polymer selectivity was 100%, and Mw of PnBVE was 4020 and Mw/Mn was 1.40.

From the results of Examples 7 and 8, it was confirmed that the molecular weight of the polymer can be further increased by reducing the use amount of the initiator.

Example 9

Production of Polypropvl Vinyl Ether (Addition of 0.20 mol % of Sodium Hydroxide)

Into a flask, there were added a stirrer, 45 g (522 mmol) of propyl vinyl ether (herein under referred to as "PrVE"), 3.6 g (15.6 mmol, 3 mol % based on the monomer) of MAIB, 37.2 g of ion exchange water, and 4.18 g of 1 wt % aqueous sodium hydroxide solution as an additive (corresponds to 1.04 mmol of sodium hydroxide, 0.20 mol % based on the monomer), and the flask was plugged. The pH of the feed solution was 12.4. Stirring was continued until MAIB was dissolved, then the flask was placed in a water bath which was preheated to 60° C., and heated with stirring for 7 hours to polymerize. After completion of polymerization, polymerization was stopped by cooling the flask in an ice bath to give polypropyl vinyl ether (herein under referred to as "PPrVE"). The conversion rate of PrVE was 76%, the polymer selectivity was 100%, Mw of PPrVE was 6640, and Mw/Mn was 1.34.

Comparative Example 4

Production of Polypropyl Vinyl Ether (Addition of 0.01 mol % of Hydrogen Chloride)

PPrVE was synthesized in a similar manner as Example 9, except that the additive was changed to 0.19 g of 1 wt % hydrochloric acid (corresponds to 0.052 mmol of hydrogen chloride, 0.01 mol % based on the monomer). The pH of the aqueous phase was 3.6. The conversion rate of PrVE was 100%, the polymer selectivity was 8%; however no polymer peak was detected from GPC.

Example 10

Production of Polyisobutyl Vinyl Ether (Addition of 0.20 mol % of Sodium Hydroxide)

Into a flask, there were added a stirrer, 45 g (449 mmol) of isobutyl vinyl ether (herein under referred to as "iBVE"), 3.1 g (13.5 mmol, 3 mol % based on the monomer) of MAIB, 38.3 g of ion exchange water, and 3.59 g of 1 wt % aqueous sodium hydroxide solution as an additive (corresponds to 0.90 mmol of sodium hydroxide, 0.20 mol % based on the monomer), and the flask was plugged. The pH of the aqueous phase was 12.3. Hereafter, polypropyl vinyl ether (herein under referred to as "PiBVE") was obtained in the same manner as Example 1. The conversion rate of iBVE was 52%, the polymer selectivity was 100%, Mw of PiBVE was 5100, and Mw/Mn was 1.46.

Example 11

Production of Polyisobutyl Vinyl Ether) (MAIB 0.2 mol %, Review of Polymerization Time)

PiBVE was synthesized in a similar manner as Example 10, except that MAIB was added in 0.21 g (0.91 mmol, 0.20 mol % based on the monomer) and the additive added was 2.16 g of 1 wt % of aqueous lithium hydroxide solution (corresponds to 0.90 mmol of lithium hydroxide, 0.20 mol % based on the monomer), and the polymerization time was changed to 96 hours. The pH of the aqueous phase was 12.4. At this time, sampling was carried out at the time when the polymerization time was 3 hours, 7 hours, 24 hours, 48 hours, and 96 hours, and the polymer selectivity, the conversion rate of iBVE, Mw and Mw/Mn of PiBVE at each polymerization time were measured. The polymer selectivity was 100% in all cases, irrespective of the polymerization time. The conversion rate of iBVE was 12% (3 hours), 15% (7 hours), 35% (24 hours), 45% (48 hours), 45% (96 hours), respectively. The Mw of PiBVE was 7700 (3 hours), 7700 (7 hours), 11000 (24 hours), 14000 (48 hours), 10400 (96 hours), respectively. Mw/Mn of PiBVE was 1.48 (3 hours), 1.48 (7 hours), 1.66 (24 hours), 1.66 (48 hours), 1.60 (96 hours), respectively.

In view of the result from Example 11, it was confirmed that the less the amount of the initiator used, the more the molecular weight of the polymer can be increased in the polymerization of vinyl ether containing hydrocarbon group, and that at this time, the monomer conversion rate can be increased by making the polymerization time longer.

Comparative Example 5

Production of Polyisobutyl Vinyl Ether (Addition of 0.01 mol % of Hydrogen Chloride)

PiBVE was synthesized in a similar manner as Example 10, except that the additive was changed to 0.16 g of 1 wt % hydrochloric acid (corresponds to 0.044 mmol of hydrogen chloride, 0.01 mol % based on the monomer). The pH of the aqueous phase was 3.7. The conversion rate of iBVE was 96%, the polymer selectivity was 26%, Mw of PiBVE was 2150, and Mw/Mn was 1.30.

Comparative Example 6

Production of Polyisobutyl Vinyl Ether (No Addition of Additive)

PiBVE was synthesized in a similar manner as Example 11, except that the additive, lithium hydroxide was not added, and ultrapure water (manufactured by FUJIFILM Wako Pure Chemical Corporation) was used instead of the ion exchange water, and polymerization was conducted for 7 hours. The pH of the aqueous phase was 5.9. The conversion rate of iBVE was 83%, the polymer selectivity was 54%, Mw of PiBVE was 3200, and Mw/Mn was 1.60.

Comparative Example 7

Production of Polyisobutyl Vinyl Ether) (Production in Toluene)

PiBVE was synthesized in a similar manner as Example 11, except that no additive was added, toluene was used instead of water, and the polymerization time was changed to 7 hours. pH was unmeasurable as no aqueous phase existed. The conversion rate of iBVE was 20%, the polymer selectivity was 100%, Mw of PiBVE was 2800, and Mw/Mn was 1.30.

From the results of Examples 10 and 11 and Comparative Examples 5 to 7, it was confirmed that the use of the water solvent and addition of the basic compound in the polymerization of vinyl ether containing hydrocarbon group can greatly increase the molecular weight of the polymer and improve the polymer selectivity.

Example 12

Production of Polycyclohexyl Vinyl Ether (Addition of 0.20 mol % of Sodium Hydroxide)

Into a flask, there were added a stirrer, 45 g (357 mmol) of cyclohexyl vinyl ether (herein under referred to as "CHVE"), 2.5 g of MAIB (10.9 mmol, 3 mol % based on the monomer), 39.7 g of ion exchange water, and 2.85 g of 1 wt % aqueous sodium hydroxide solution as an additive (corresponds to 0.71 mmol of sodium hydroxide, 0.20 mol % based on the monomer), and the flask was plugged. The pH of the aqueous phase was 12.3. Hereafter, polycyclohexyl vinyl ether (herein under referred to as "PCHVE") was obtained in the same manner as Example 1. The conversion rate of CHVE was 58%, the polymer selectivity was 100%, Mw of PCHVE was 2240, and Mw/Mn was 1.35.

Comparative Example 8

Production of Polycyclohexyl Vinyl Ether (Addition of 0.01 mol % of Hydrogen Chloride)

PCHVE was synthesized in a similar manner as Example 12, except that the additive was changed to 0.13 g of 1 wt % of hydrochloric acid (corresponds to 0.036 mmol of hydrogen chloride, 0.01 mol % based on the monomer). The pH of the aqueous phase was 3.8. The conversion rate of CHVE was 97%, the polymer selectivity was 20%, Mw of PCHVE was 1480, and Mw/Mn was 1.29.

Example 13

Production of Poly(2-Ethylhexyl Vinyl Ether)
(Addition of 0.20 mol % of Sodium Hydroxide)

Into a flask, there were added a stirrer, 45 g (288 mmol) of 2-ethylhexyl vinyl ether (herein under referred to as "2-EHVE"), 2.0 g (8.69 mmol, 3 mol % based on the monomer) of MAIB, 40.7 g of ion exchange water, 2.30 g of 1 wt % aqueous sodium hydroxide solution as an additive (corresponds to 0.58 mmol of sodium hydroxide, 0.20 mol % based on the monomer), and the flask was plugged. The pH of the aqueous phase was 12.2. Hereafter, polypropyl vinyl ether (herein under referred to as "PEHVE") was obtained in the same manner as Example 1. The conversion rate of iBVE was 56%, the polymer selectivity was 100%, Mw of PEHVE was 5220, and Mw/Mn was 1.42.

Comparative Example 9

Production of Poly(2-Ethylhexyl Vinyl Ether)
(Addition of 1 mol % of Hydrogen Chloride)

PEHVE was synthesized in a similar manner as Example 13, except that the additive was changed to 1.05 g (corresponds to 2.87 mmol of hydrogen chloride, 1 mol % based on the monomer) of 10 wt % hydrochloric acid. The pH of the aqueous phase was 2.3. The conversion rate of 2-EHVE was 56%, the polymer selectivity was 77%, Mw of PEHVE was 4390, and Mw/Mn was 1.47.

It was confirmed from the results of Examples 9 to 13 and Comparative Examples 4 to 9 that in order to proceed radical polymerization while suppressing the monomer decomposition, pH adjustment is necessary with the vinyl ether containing a hydrocarbon group other than the nBVE.

The summary of Examples 1 to 13 and Comparative Examples 1 to 9 is shown in Table 1.

TABLE 1

|  | VE | MAIB/ mol %* | Additive | Additive/ mol %* | pH (Aqueous phase) | Monomer Conversion Rate/ % | Polymer Selectivity**/ % | Mw | Mw/ Mn |
|---|---|---|---|---|---|---|---|---|---|
| Example 1 | nBVE | 3 | NaOH | 0.2 | 12.5 | 53 | 100 | 4920 | 1.46 |
| Example 2 | nBVE | 3 | NaOH | 0.01 | 10.5 | 46 | 100 | 4900 | 1.45 |
| Example 3 | nBVE | 3 | None | 0 | 6.0 | 56 | 84 | 3430 | 1.29 |
| Example 4 | nBVE | 3 | LiOH | 0.2 | 12.5 | 53 | 100 | 4800 | 1.44 |
| Example 5 | nBVE | 3 | TEA | 0.2 | 10.8 | 55 | 100 | 4850 | 1.43 |
| Example 6 | nBVE | 3 | NH3 | 0.2 | 10.7 | 52 | 100 | 4870 | 1.44 |
| Example 7 | nBVE | 1 | LiOH | 0.2 | 12.2 | 41 | 100 | 7090 | 1.33 |
| Example 8 | nBVE | 5 | LiOH | 0.2 | 12.1 | 59 | 100 | 4020 | 1.40 |
| Example 9 | PrVE | 3 | NaOH | 0.2 | 12.4 | 76 | 100 | 6640 | 1.34 |
| Example 10 | iBVE | 3 | NaOH | 0.2 | 12.3 | 52 | 100 | 5100 | 1.46 |
| Example 11*** | iBVE | 0.2 | LiOH | 0.2 | 12.4 | 45 | 100 | 10400 | 1.60 |
| Example 12 | CHVE | 3 | NaOH | 0.2 | 12.3 | 58 | 100 | 2240 | 1.35 |
| Example 13 | EHVE | 3 | NaOH | 0.2 | 12.2 | 56 | 100 | 5220 | 1.42 |
| Comparative Example 1 | nBVE | 3 | HCl | 0.0001 | 5.1 | 89 | 23 | 2820 | 1.40 |
| Comparative Example 2 | nBVE | 3 | HCl | 0.01 | 3.2 | 98 | 26 | 1840 | 1.26 |
| Comparative Example 3 | nBVE | 3 | HCl | 1 | 2.0 | 100 | 17 | 1440 | 1.09 |
| Comparative Example 4 | PrVE | 3 | HCl | 0.01 | 3.6 | 100 | 8 | no polymer | no polymer |
| Comparative Example 5 | iBVE | 3 | HCl | 0.01 | 3.7 | 96 | 26 | 2150 | 1.30 |
| Comparative Example 6 | iBVE | 0.2 | None | 0 | 5.9 | 83 | 54 | 3200 | 1.60 |
| Comparative Example 7**** | iBVE | 0.2 | None | 0 | unmeasurable | 20 | 100 | 2800 | 1.30 |
| Comparative Example 8 | CHVE | 3 | HCl | 0.01 | 3.8 | 97 | 20 | 1480 | 1.29 |
| Comparative Example 9 | EHVE | 3 | HCl | 1 | 2.3 | 56 | 77 | 4390 | 1.47 |

Remrks
*based on monomer
**100% represents that "material alcohol is not detected by GC."
***It is discribed as the result after 96 hours.
****toluene solvent

The invention claimed is:

1. A method for producing a vinyl ether polymer containing a hydrocarbon group, comprising the step of polymerizing a monomer selected from the group consisting of the vinyl ethers represented by the following formula (1):

(1)

wherein $R^1$ represents an aliphatic hydrocarbon group having 1 to 10 carbons or an alicyclic hydrocarbon group having 3 to 10 carbons,
in the presence of water as a polymerization solvent and an organic azo-based compound as a radical polymerization initiator, under pH of 6 or more,
wherein a basic compound as a pH adjusting agent is added in an amount of 0.001 to 1 mol % based on the total amount of the monomer, and
wherein the weight average molecular weight of the vinyl ether polymer is within the range of 2000 to 50000.

2. The production method according to claim 1, wherein the basic compound is an alkali metal hydroxide or an amine compound.
3. The production method according to claim 1, wherein the organic azo-based compound is a compound represented by the following formula (2):

wherein $R^2$ to $R^5$ each independently represent a hydrogen atom or an alkyl group; and $R^6$ and $R^7$ each independently represent a nitrile group, an ester group having an alkoxy moiety optionally having a substituent, or an amide group having an alkylamino moiety optionally having a substituent.
4. The production method according to claim 1, wherein the organic azo-based compound is an azo ester compound.
5. The production method according to claim 1, wherein polymer selectivity is 80% or more.

* * * * *